June 12, 1951 — M. H. GROVE — 2,556,689
VALVE
Filed Nov. 9, 1945
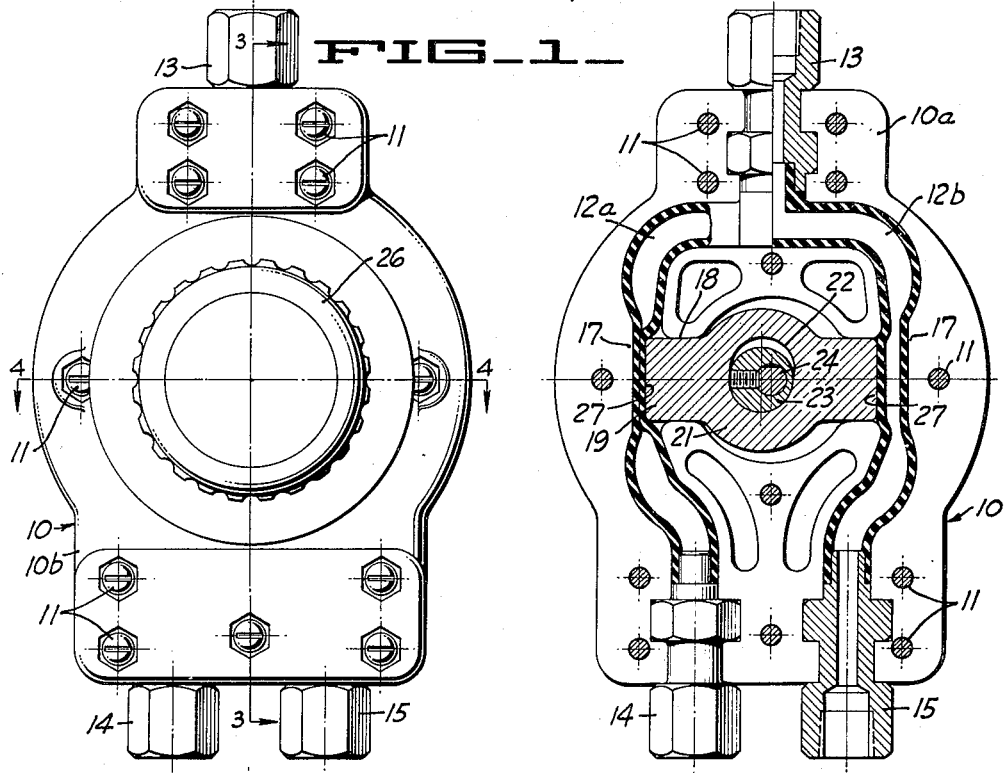
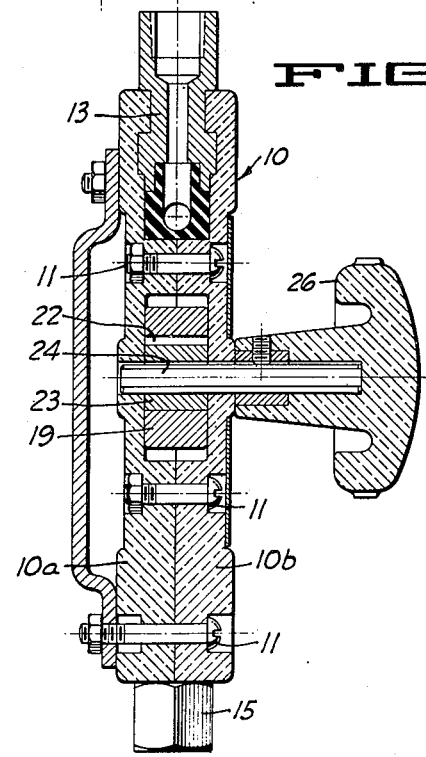
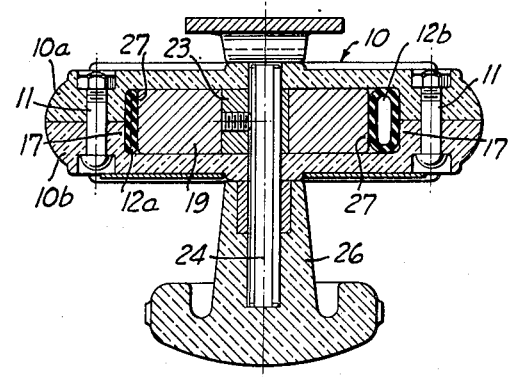
INVENTOR.
Marvin H. Grove
BY Paul D. Flehr
ATTORNEY Patented June 12, 1951

2,556,689

UNITED STATES PATENT OFFICE 2,556,689

VALVE

Marvin H. Grove, Piedmont, Calif., assignor, by mesne assignments, to Grove Regulator Company, a corporation of California Application November 9, 1945, Serial No. 627,678

3 Claims. (Cl. 277—13)

This invention relates generally to valves for the control of fluid flow. It is particularly applicable to the construction of valves of relatively small flow capacity and intended to be used in conjunction with other fluid operated or fluid pressure controlled equipment.

In the operation of many types of fluid operated or fluid pressure controlled equipment, it is desirable to provide a small manually operated pilot valve which may be located at a point remote from the apparatus being operated. An example of such an arrangement is disclosed in Patent No. 2,353,143 where the pilot valve controls the venting or application of fluid pressure to the operating chamber of a main valve. Also it is frequently desirable in such installations to provide a pilot capable of controlling fluid flow through two passages, or in other words one having three points of connection to the associated piping. Valves used in such services must have certainty of opening and closing action, and in addition there must be complete freedom from sticking. Likewise it is desirable that the construction be relatively simple and that the work of servicing and repair be reduced to a minimum.

It is an object of the present invention to provide a valve suitable for the purposes outlined above, and which in particular affords certainty of opening and closing action, in conjunction with simplicity of construction.

A further object of the invention is to provide a valve of the above character which does not require use of closely machined parts, and which can be readily serviced or repaired.

Further objects of the invention will appear from the following description in which the preferred embodiment has been set forth in detail in conjunction with the accompanying drawing.

Referring to the drawing:

Figure 1 is a plan view showing a valve incorporating the present invention.

Figure 2 is a view similar to Figure 1 but with one-half of the body removed, and with certain parts shown in section.

Figure 3 is a cross-sectional view taken along the line 3—3 of Figure 1.

Figure 4 is a cross-sectional view taken along the line 4—4 of Figure 1.

The valve illustrated in the drawing consists generally of a body 10 which is preferably formed in two halves 10a, 10b. These parts can be formed of suitable material such as a molded phenolic condensate product, and is shown being held together by the clamping bolts 11. The interior of the body is formed to accommodate two tubes 12a, 12b, which are formed of suitable resilient rubber or synthetic rubber-like material. At one end of the body the two tubes 12a, 12b connect together and to the metal fitting 13, and at the other end of the body the tubes individually connect with metal fittings 14, 15. It will be noted that the fittings have hexagonal portions 16, whereby they are interlocked in the body and held against rotation.

The fittings can be variously connected with associated piping. For example fluid pressure can be applied to fitting 13, and fittings 14 and 15 connected to piping to which fluid is to be supplied. Another possible arrangement is to connect fittings 14 and 15 to pipes supplying fluid under pressure, with the fitting 13 being connected to piping to which pressure is to be supplied. When used in place of the hand operated pilot valve disclosed in said Patent No. 2,353,143, fitting 13 can be connected to the pressure chamber of the main valve, fitting 14 to the upstream side of the valve, and fitting 15 to the downstream side.

The coring of the body to accommodate the tubes 12a, 12b, is such that these tubes have portions of the same extending substantially parallel to each other, and spaced apart as illustrated. Likewise it is desirable that abutments 17 be provided, which are formed and located in such a manner that normally the adjacent portions of the tubes 12a, 12b are somewhat distorted or flattened in a lateral direction.

The coring of the body also provides a guideway 18 extending laterally between the parallel tube portions, and which serves to slidably retain the member 19. The intermediate portion 21 of member 19 is enlarged as illustrated and is provided with an oval shaped opening 22, to accommodate the eccentric 23. The eccentric is mounted upon a shaft 24 which extends through the body and which has an operating knob 26 attached to its exterior portion. Member 19 is provided with relatively flat end portions 27, which serve to engage the opposed inner walls of the rubber tubes. The dimensioning is such that for positions of the eccentric 23, 180° apart, one or the other of the end faces 27 press against and close the associated tubing by pinching action. While one end face 27 is pinching off its associated tubing, the other end face is serving as an abutment for one wall of the tubing to withstand pressure within the same.

Operation of the valve described above can be summarized as follows: Assuming that the fittings 13, 14, 15 are connected with associated piping, an operator can close off either one of the two tubes 12a, 12b, by turning knob 26 between its two limiting positions, namely the position of the eccentric 23 shown in Figure 2, and a position displaced 180° from the position illustrated. When turning the knob 26 between these two limiting positions member 19 slides laterally within the guideway 18, to press against and close off either one of the two rubber tubes. The walls of both rubber tubes are at all times supported by walls within the body, thus enabling them to withstand relatively high pressures. When in a given limiting position, pressure applied to the member 19 from the closed tube, due to compression of the resilient material and to the line pressure, cannot displace this member because of the locking action of the eccentric 23.

I claim:

1. In a valve, a body, a pair of fluid conveying tubes of resilient material extending within the body, said tubes having spaced substantially parallel portions, metal fittings engaged by end portions of the body and connected to the tubes, a member slidably carried within the body and disposed between said parallel tube portions, said member having end faces engaging the inner opposed side walls of the tubes, and means for moving said member between either one of two operating positions, in one of which one tube is closed by bringing the side walls of the tube into inner wall to wall contact and the other tube permitted to open and in the other one of which the other tube is closed by bringing the side walls of the tube into inner wall to wall contact and the first mentioned tube permitted to open.

2. In a valve, a body, a pair of rubber tubes extending within the body and having spaced substantially parallel portions, metal fittings engaged by end portions of the body and connected to the tubes, a guideway formed within the body and extending laterally of said parallel tube portions, a member slidably disposed within said guideway, said member having end faces engaging the inner opposed side walls of the tubes, and means for moving said member in either direction to close either one of said tubes by bringing the side walls of the tube into inner wall to wall contact.

3. In a valve, a body, a pair of rubber tubes extending within the body and having substantially parallel spaced portions, a guideway formed within the body and extending laterally of said parallel tube portions, a member slidably disposed within said guideway and having end faces engaging the inner opposed side walls of the tubes, a single metal fitting carried by one end portion of the body and having fluid connection with the corresponding ends of said tubes, a pair of metal fittings carried by the opposite end portion of said body and having fluid connection with the other ends of said tubes, an eccentric carried by said body and adapted to move said member in opposite directions to close either one of said tubes by pinching off action, and manually operable means exterior of the body for the operation of said eccentric.

MARVIN H. GROVE.

REFERENCES CITED

The following references are of record in the file of this patent:

UNITED STATES PATENTS

| Number | Name | Date |
|---|---|---|
| 2,313,550 | Huber | Mar. 9, 1943 |

FOREIGN PATENTS

| Number | Country | Date |
|---|---|---|
| 619,098 | France | Mar. 25, 1927 |